United States Patent Office 3,758,459
Patented Sept. 11, 1973

3,758,459
NOVEL DERIVATIVES OF 1-CINNAMYL BENZIMIDAZOLE, THEIR PROCESS OF PREPARATION AND THEIR THERAPEUTIC APPLICATION
Claude P. Fauran, Paris, Jeannine A. Eberle, Chatou, Guy M. Raynaud, Paris, and Yves J. Bailly, Nanterre, France, assignors to Delalande S.A., Courbevoie (Hauts-de-Seine), France
No Drawing. Filed Nov. 26, 1971, Ser. No. 202,596
Claims priority, application France, Nov. 27, 1970, 7042636
Int. Cl. C07d 49/38
U.S. Cl. 260—240 K                    9 Claims

ABSTRACT OF THE DISCLOSURE

A compound of the formula

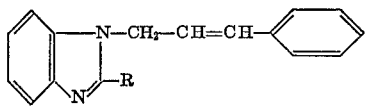

wherein
R is alkyl or hydroxyalkyl having 1 to 3 carbon atoms, or phenyl substituted with at least one alkoxy or at least one halogen, or benzyl disubstituted on the benzene ring with halogen and alkoxy, or

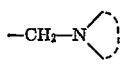

in which

is dialkylamino in which the two alkyls are identical, or piperidino, morpholino or pyrrolidino
is prepared by reacting the corresponding 2-substituted benzimidazole with cinnamyl chloride. The compounds possess hypotensive, vasodilatric, respiratory analeptic, analgesic, antiinflammatory, spasmolytic and diuretic properties.

---

The present invention relates to novel derivatives of 1-cinnamyl benzimidazole, their process of preparation and their therapeutic application.

The novel derivatives according to the present invention correspond to the general formula:

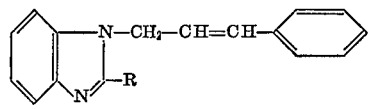

(I)

in which R represents:
an alkyl radical having 1 to 3 carbon atoms, optionally substituted by a hydroxy radical;
a phenyl ring substituted by at least one alkoxy radical or at least one halogen atom;
a benzyl radical, disubstituted in the benzene ring by a halogen atom and an alkoxy group; or
a radical of the formula:

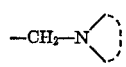

in which the

group represents a dialkylamino radical, in which the two alkyl radicals are identical, or a heterocyclic radical selected from piperidino, morpholino and pyrrolidino.

The process of preparation of such derivatives in accordance with the invention comprises reacting a 2-substituted benzimidazole of the general formula:

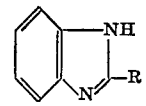

(II)

with cinnamyl chloride of the formula:

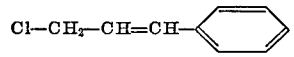

(III)

in the presence of sodium hydride (NaH) in dimethylformamide as solvent, R having the same signification as in Formula I above.

The following preparations are given by way of example in order to illustrate the invention.

EXAMPLE 1

1-cinnamyl 2-methyl benzimidazole (Code No. 69126)

0.1 mol of sodium hydride (in the form of a 50% suspension in a mineral oil) is added, over a period of 20 minutes, to a solution of 0.1 mol of 2-methyl benzimidazole in 80 ml. of dimethylformamide.

The temperature increases to 40° C. The mixture is warmed and maintained at 50° C. for 10 minutes with agitation. The reaction mixture is allowed to cool to ambient temperature and then, over a period of 10 minutes, a solution of 0.1 mol of cinnamyl chloride in 20 ml. of dimethylformamide is added thereto. The temperature increases to 40° C. The mixture is a violet-like colour. The mixture is then heated for 20 minutes at 80° C., diluted with 200 ml. of water, extracted with chloroform and the extract is washed with water, dried and evaporated. The product is recrystallised from ethyl acetate and dried over $P_2O_5$.

Melting point=102° C.
Yield=50%
Empirical formula=$C_{17}H_{16}N_2$

Elementary analysis.—Calcd. (percent): C, 82.22; H, 6.50; N, 11.28. Found (percent): C, 82.22; H, 6.72; N, 11.39.

EXAMPLE 2

1-cinnamyl 2-(3'-hydroxypropyl) benzimidazole and its hydrochloride (Code No. 69282)

0.5 mol of sodium hydride is added, at ambient temperature and over a period of 15 minutes, to a solution of 0.5 mol of 2-(3'-hydroxypropyl) benzimidazole in 400 ml. of dimethylformamide whilst ensuring that the temperature does not exceed 40° C. The reaction mixture is thereafter maintained at 50° C. for 10 minutes. The mixture is then allowed to cool to 30° C. and then cinnamyl chloride is added thereto over a period of 10 minutes. The reaction mixture is maintained at 80° C. for 20 minutes is then allowed to cool to ambient temperature. The mixture is diluted with water and the oil so formed is extracted with chloroform. The mixture is then dried and evaporated and the residue formed is crystallised by the addition of ether. 67 g. of 1-cinnamyl 2-(3'-hydroxypropyl) benzimidazole are obtained by recrystallisation from an ethanol/petrol ether (33%) mixture.

Melting point=95° C.
Yield=46%
Empirical formula=$C_{19}H_{20}NO_2$

*Elementary analysis.*—Calcd. (percent): C, 78.05; H, 6.90 N, 9.58. Found (percent): C, 78.21; H, 7.15; N, 9.53.

The hydrochloride may be obtained by treating a solution of 0.2 mol of the compound described above in 500 ml. of ethanol with 20 ml. of 10 N hydrochloric alcohol. The residue is evaporated and recrystallised from isopropyl alcohol.

Melting point=145° C.
Yield=82%
Empirical formula=$C_{19}H_{21}ClNO_2$

*Elementary analysis.*—Calcd. (percent): C, 69.39; H, 6.44; N, 8.52. Found (percent): C, 69.44; H, 6.41; N, 8.36.

The compounds listed in the following Table I have been prepared according to the methods disclosed in the Examples 1 and 2:

The compounds of Formula I have been tested on animals in the laboratory and have been shown to possess hypotensive, vasodilatric, respiratory analepitc, analgesic, antiinflammatory, spasmolytic and diuretic properties.

(1) Hypotensive properties: The compounds of the Formula I, when administered by intravenous or introduodenal means to an anesthetised rat, provoke a reduction in the arterial pressure.

By way of example, the results obtained with two compounds of the Formula I are given in the following Table II:

TABLE II

| Code No. of compound tested | Dose administered | Lowering of arterial pressure | |
|---|---|---|---|
| | | Intensity, percent | Duration, min. |
| 69126 | 10 mg./kg./i.d. | 50 | >40 |
| 7064 | 2 mg./kg./i.v. | 35 | >45 |

(2) Vasodilatric properties: The compounds of Formula I are capable of augmenting the flow in coronary canals in the isolated heart of a guinea-pig when they are added to perfusion liquids for this organ.

By way of example, the results obtained with two of the compounds of Formula I are given in the following Table III:

TABLE I

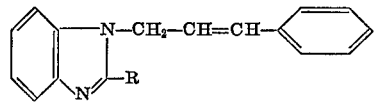

| | | | | | Melting point (° C.) | Yield, percent | Elementary analysis | | | | | |
|---|---|---|---|---|---|---|---|---|---|---|---|---|
| | | | | | | | Calculated | | | Found | | |
| Code No. | R | Form | Empirical formula | Molecular weight | | | C | H | N | C | H | N |
| 69125 | —CH(OH)—CH$_3$ | Base | $C_{18}H_{18}N_2O$ | 278.34 | 144 | 43 | 77.67 | 6.52 | 10.07 | 77.46 | 6.34 | 10.11 |
| 69244 | —CH$_2$OH | do | $C_{17}H_{16}N_2O$ | 264.31 | 162 | 57 | 77.24 | 6.10 | 10.60 | 77.10 | 5.92 | 10.54 |
| 69338 | (2,4,5-trimethoxyphenyl) | Maleate | $C_{29}H_{28}N_2O_7$ | 516.53 | 160 | 78 | 67.43 | 5.46 | 5.62 | 67.24 | 5.42 | 5.53 |
| 7078 | (4-chlorophenyl) | Base | $C_{22}H_{17}ClN_2$ | 344.83 | 100 | 20 | 76.62 | 4.97 | 8.12 | 76.62 | 4.99 | 8.10 |
| 69330 | —CH$_2$—(2-ethoxy-5-chlorophenyl) | do | $C_{25}H_{23}ClN_2O$ | 402.91 | 110 | 31.5 | 74.52 | 5.75 | 6.95 | 74.47 | 5.99 | 6.75 |
| 70123 | —CH$_2$—(2-methoxy-5-chlorophenyl) | do | $C_{24}H_{21}ClN_2O$ | 388.88 | 199 | 43 | 74.12 | 5.44 | 7.20 | 74.14 | 5.35 | 7.21 |
| 7027 | —CH$_2$N(nC$_3$H$_7$)$_2$ | HCl | $C_{23}H_{30}ClN_3$ | 383.95 | 126 | 22 | 71.94 | 7.88 | 10.95 | 71.83 | 7.85 | 10.82 |
| 7023 | —CH$_2$N(piperidinyl) | HCl | $C_{22}H_{26}ClN_3$ | 367.91 | 191 | 40 | 71.82 | 6.52 | 11.42 | 72.02 | 7.14 | 11.54 |
| 7040 | —CH$_2$N(morpholinyl) | HCl | $C_{21}H_{24}ClN_3O$ | 369.88 | 183 | 51 | 68.19 | 6.54 | 11.36 | 67.99 | 6.53 | 11.42 |
| 7064 | —CH$_2$N(pyrrolidinyl) | HCl | $C_{21}H_{24}ClN_3$ | 353.88 | 216 | 20 | 71.27 | 6.84 | 11.88 | 71.46 | 6.92 | 11.67 |

TABLE III

| Code No. of compound tested | Dose introduced into the perfusion liquor | Augmentation of flow in isolated heart, percent |
|---|---|---|
| 7027 | 2.5 μg./ml | 70 |
| 7078 | 2.5 μg./ml | 50 |

(3) Respiratory analeptic properties: The compounds of Formula I, administered by intravenous means to an anesthetised guinea-pig, are capable of opposing the respiratory depression provoked by morphine.

By way of example, the results obtained with three of the compounds of Formula I are given in the following Table IV:

TABLE IV

| Code No. of compound tested | Dose administered | Augmentation of— Amplitude, percent | Rhythm, percent | Duration of effect, min. |
|---|---|---|---|---|
| 7027 | 5 mg./kg./i.v | 100 | 60 | 5 |
| 7040 | 10 mg./kg./i.v | 100 | 70 | 5 |
| 7064 | 10 mg./kg./i.v | 100 | 50 | >45 |

(4) Analagesic properties: The compounds of Formula I, administered by oral means to the mouse, are capable of reducing the number of painful stretchings produced by the intraperitoneal injection of acetic acid.

By way of example, the results obtained with several of the compounds of Formula I are given in the following Table V:

TABLE V

| Code No. of compound tested | Dose administered | Diminution of number of painful stretchings, percent |
|---|---|---|
| 7027 | 100 mg./kg./p.o | 45 |
| 69244 | 100 mg./kg./p.o | 45 |
| 69330 | 100 mg./kg./p.o | 45 |
| 69338 | 100 mg./kg./p.o | 70 |
| 7023 | 100 mg./kg./p.o | 65 |

(5) Antiinflammatory properties: The cmopounds of Formula I, administered by oral means, to the rat, are capable of reducing the under-planatary oedema provoked by the local injection of carraghenine.

By way of example, the results obtained with two of the compounds or Formula I are given in the following Table VI:

TABLE VI

| Code No. of Compound tested | Dose administered | Diminution of oedema, percent |
|---|---|---|
| 69244 | 200 mg./kg./p.o | 50 |
| 69338 | 200 mg./kg./p.o | 45 |

(6) Spasmolytic properties: The compounds of Formula I, introduced in the conserving medium, are capable of opposing the contractural action of barium chloride on the isolated duodenum of the rat. This activity is appreciable taking papaverine as standard.

By way of example, the spasmolytic activity of compound Nos. 69282, 7023 and 7064 is equivalent to that of papaverine.

(7) Diuretic properties: The compounds of Formula I, administered by oral means to the rat and mouse, simultaneously with a volume of 1 ml. of an isotonic solution of sodium per 25 g. of the corporeal weight of the mouse and with 2.5 ml. per 100 g. of the corporeal weight of the rat, are capable of provoking an augmentation of the volume of urine emitted by reference to control animals, the volume being measured for 4 hours following administration.

By way of example, the results obtained with several of the compounds of Formula I are given in the following Table VII:

TABLE VII

| Code No. of compound tested | Dose administered | Augmentation of urinary elimination, percent |
|---|---|---|
| 7078 | 10 mg./kg./p.o | 60 |
| 69125 | 10 mg./kg./p.o | 80 |
| 69282 | 10 mg./kg./p.o | 45 |
| 69338 | 10 mg./kg./p.o | 45 |

From the results shown in Tables II to VII, and in the following Table VIII, the difference between the pharmacologically active and the lethal dose is sufficiently great to permit the use of the compounds of Formula I in therapeutics.

TABLE VIII

| Code No. of compound tested | Means of administration | Dose administered in mg./kg. | Percentage mortality |
|---|---|---|---|
| 7027 | PO | 1,100 | ≃50 |
| 7040 | PO | 1,000 | ≃50 |
| 7078 | PO | 2,000 | 0 |
| 69125 | PO | 2,000 | 0 |
| 69126 | PO | 1,500 | ≃50 |
| 69244 | PO | 2,000 | 0 |
| 69282 | PO | 1,850 | ≃50 |
| 69330 | PO | 2,000 | 0 |
| 69338 | PO | 2,000 | 0 |
| 7023 | PO | 2,000 | 0 |
| 7064 | PO | 1,100 | ≃50 |
| 7064 | IV | 26.5 | 50 |

The compounds of Formula I are useful in the treatment of hypertensions, circulatory troubles, pains due to inflammation, and visceral spasms, and edema.

They may be administered by oral means in the form of tablets, dragées or gélules containing 50 to 350 mg. of active ingredient (1 to 3 times a day), by rectal means in the form of suppositories, containing 50 to 350 mg. of active ingredient (1 to 2 times a day) and by parenteral means in the form of capsules containing 5 to 250 mg. of active ingredient (1 to 3 injections a day).

Accordingly, the present invention also comprises a pharmaceutical composition comprising a compound of the general Formula I together with a pharmaceutically-acceptable carrier.

The embodiments of the invention in which an exclusive property or privilege is claimed are defined as follows:

1. A compound of the formula:

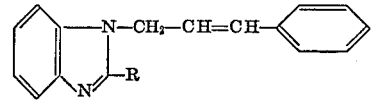

in which R is an alkyl or hydroxyalkyl radical having 1 to 3 carbon atoms; or a radical of the formula:

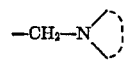

in which the

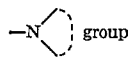 group represents a dialkylamino radical in which the alkyl has from 1 to 4 carbon atoms, in which the two alkyl radicals are identical, or a heterocyclic radical selected from piperidino, morpholino and pyrrolidino, and the pharmaceutically acceptable acid addition salts thereof.

2. A compound according to claim 1, in which R is methyl.

3. A compound according to claim 1, in which R is 3-hydroxypropyl.

4. A compound according to claim 1, in which R is —CH(OH)—CH₃.

5. A compound according to claim 1, in which R is —CH₂OH.

6. A compound according to claim 1, in which R is —CH₂—N(nC₃H₇)₂.

7. A compound according to claim 1, in which R is

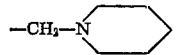

8. A compound according to claim 1, in which R is

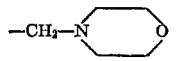

9. A compound according to claim 1, in which R is

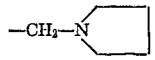

References Cited
UNITED STATES PATENTS
3,080,282  3/1963  Shunk _____ 260—309.2 X JOHN D. RANDOLPH, Primary Examiner U.S. Cl. X.R.
424—248, 267, 273; 260—247.5 B, 293.6, 309.2